(12) United States Patent
Liu

(10) Patent No.: US 7,757,106 B2
(45) Date of Patent: Jul. 13, 2010

(54) SLEEP CONTROL SIGNAL SEQUENCE CIRCUIT

(75) Inventor: Bai-Hong Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 648 days.

(21) Appl. No.: 11/757,405

(22) Filed: Jun. 4, 2007

(65) Prior Publication Data

US 2008/0150592 A1 Jun. 26, 2008

(30) Foreign Application Priority Data

Dec. 22, 2006 (CN) .................... 2006 1 0157874

(51) Int. Cl.
*G06F 1/00* (2006.01)
*G06F 13/14* (2006.01)
*H03L 7/00* (2006.01)
*H03K 17/00* (2006.01)
*G05F 1/00* (2006.01)

(52) U.S. Cl. ............... 713/300; 713/320; 713/323; 327/142; 327/415; 327/520; 710/305

(58) Field of Classification Search ............... 713/300, 713/320, 323; 327/142, 415, 520; 710/305
See application file for complete search history.

(56) References Cited

U.S. PATENT DOCUMENTS

| | | | | |
|---|---|---|---|---|
| 6,523,128 | B1 * | 2/2003 | Stapleton et al. | 713/330 |
| 6,654,896 | B1 * | 11/2003 | Saunders et al. | 713/323 |
| 6,691,238 | B1 * | 2/2004 | Forbes et al. | 713/323 |
| 6,732,280 | B1 * | 5/2004 | Cheok et al. | 713/300 |

* cited by examiner

Primary Examiner—Stefan Stoynov
(74) Attorney, Agent, or Firm—Frank R. Niranjan

(57) ABSTRACT

A sequence circuit includes a switch circuit (30) and a control circuit (50). The switch circuit has an input terminal connected with a node (11) and an output terminal connected to a super I/O chip (10). The control circuit includes a first transistor (Q4) and a second transistor (Q5), the first transistor has a gate connected to the node and a drain connected to a sleep control signal terminal (S3'), the second transistor has a base connected to the drain of the first transistor and a collector connected to the super I/O chip. When the computer is off or in one of the sleep states, the node is at low level and the output terminal of the switch circuit outputs a low level signal; when the computer is on, the node is at high level and the output terminal outputs a high level signal.

15 Claims, 3 Drawing Sheets

SLEEP CONTROL SIGNAL SEQUENCE CIRCUIT

BACKGROUND OF THE INVENTION

1. Field of the Invention

The present invention relates to sequence circuits, and more particularly to a sequence circuit for making a sequence of a sleep control signal generated by a chipset consistent with that of sleep control signals generated by a super I/O chip on a motherboard of a computer.

2. Description of Related Art

A chipset is very important on a motherboard of a computer. When the computer enters a sleep state, it requires that a sequence of a sleep control signal generated by the chipset is consistent with that of sleep control signals generated by a super I/O chip; however, it still exists that the sequences of the sleep control signals generated by the chipset and the super I/O chip are not always compatible with each other due to different manufacturers producing the chipset and the super I/O chip.

What is needed, therefore, is a sequence circuit which can ensure sequences of sleep control signals generated by the chipset and the super I/O chip are compatible with each other.

SUMMARY OF THE INVENTION

A sequence circuit for making a sleep control signal output from a sleep control signal terminal of a chipset consistent with a first sleep signal and a second sleep signal output from a first sleep signal terminal and a second sleep signal terminal of a super I/O chip of a computer includes a switch circuit and a control circuit. The switch circuit has an input terminal connected with a node and an output terminal connected to the first sleep signal terminal of the super I/O chip. The control circuit includes a first transistor and a second transistor, the first transistor has a gate connected to the node and a drain connected to the sleep control signal terminal of the chipset, the second transistor has a base connected to the drain of the first transistor and a collector connected to the second sleep signal terminal of the super I/O chip. When the computer is off or in one of the sleep states, the node is at low level and the output terminal of the switch circuit outputs a low level signal; when the computer is on, the node is at high level and the output terminal of the switch circuit outputs a high level signal.

Other advantages and novel features of the present invention will become more apparent from the following detailed description of preferred embodiment when taken in conjunction with the accompanying drawings, in which:

DETAILED DESCRIPTION OF THE INVENTION

Figure 1:
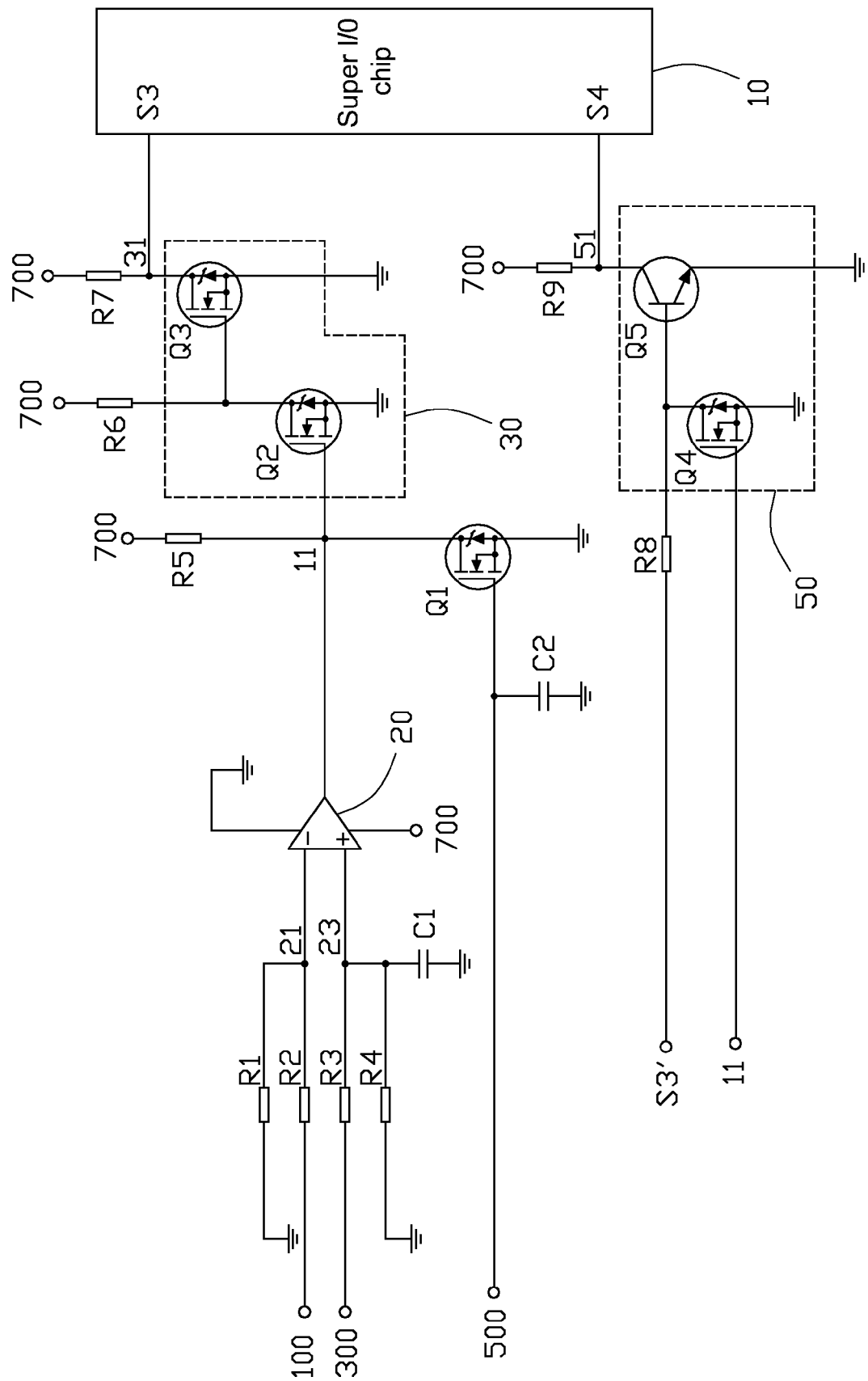
FIG. 1 is a diagram of a sequence circuit in accordance with a preferred embodiment of the present invention.

Referring to FIG. 1, when a computer enters a sleep state, a chipset on a motherboard of the computer will output a sleep control signal S3', a super I/O chip 10 on the motherboard will output a first sleep signal S3 and a second sleep signal S4 for controlling two different sleep states. The first sleep signal S3 is provided for storing a running program in a memory of the computer at a first sleep state, the second sleep signal S4 is provided for storing the running program in a hard disk of the computer at a second sleep state. A sequence circuit of a preferred embodiment of the present invention is provided for making a sequence of the sleep control signal S3' generated by the chipset consistent with that of the first sleep signal S3 and the second signal S4 generated by the super I/O chip 10 to ensure normal running of the computer. The sequence circuit includes an assistant voltage terminal 100 for providing a +5V voltage to electronic components on a motherboard of the computer, a main voltage terminal 300 for providing a +12V voltage to the computer, a startup signal terminal 500, a comparator 20, a transistor Q1, a switch circuit 30, a control circuit 50, and a sleep control signal (S3') terminal. The startup signal terminal 500 is at high level when the computer is off or in one of the sleep states, and at low level when the computer is turned on and awake. The switch circuit 30 includes a transistor Q2 and a transistor Q3. The control circuit 50 includes a transistor Q4 and a transistor Q5. The transistors Q1, Q2, Q3 and Q4 of the preferred embodiment are all field effect transistors (FETs).

The assistant voltage terminal 100 is connected to an inverting terminal of the comparator 20 through a resistor R2 and a node 21. The node 21 is connected to ground through a resistor R1. The main voltage terminal 300 is connected to a non-inverting terminal of the comparator 20 through a resistor R3 and a node 23. The node 23 is connected to ground through a resistor R4 and a capacitor C1 connected in parallel. A power source terminal 700 is connected to the comparator 20. The comparator 20 is also connected to ground. An output terminal of the comparator 20 is connected to a gate of the transistor Q2 as an input terminal of the switch circuit 30 through a node 11. The node 11 is also connected to the power source terminal 700 through a resistor R5. A drain of the transistor Q2 is connected to the power source terminal 700 through a resistor R6. A source of the transistor Q2 is connected to ground. A gate of the transistor Q3 is connected to the drain of the transistor Q2. A drain of the transistor Q3 as an output terminal of the switch circuit 30 is connected to the power source terminal 700 through a node 31 and a resistor R7. A source of the transistor Q3 is connected to ground. The startup signal terminal 500 is connected to a gate of the transistor Q1. The gate of the transistor Q1 is also connected to ground through a capacitor C2. A drain of the transistor Q1 is connected to the node 11. A source of the transistor Q1 is connected to ground. A gate of the transistor Q4 as an input terminal of the control circuit 50 is connected to the node 11. A drain of the transistor Q4 is connected to the S3' signal terminal through a resistor R8. A source of the transistor Q4 is connected to ground. A base of the transistor Q5 is connected to the drain of the transistor Q4. A collector of the transistor Q5 as an output terminal of the control circuit 50 is connected to the power source terminal 700 through a node 51 and a resistor R9. An emitter of the transistor Q5 is connected to ground. A first sleep signal (S3) terminal of the super I/O chip 10 is connected to the node 31, and a second sleep signal (S4) terminal of the super I/O chip 10 is connected to the node 51.

Figure 2:
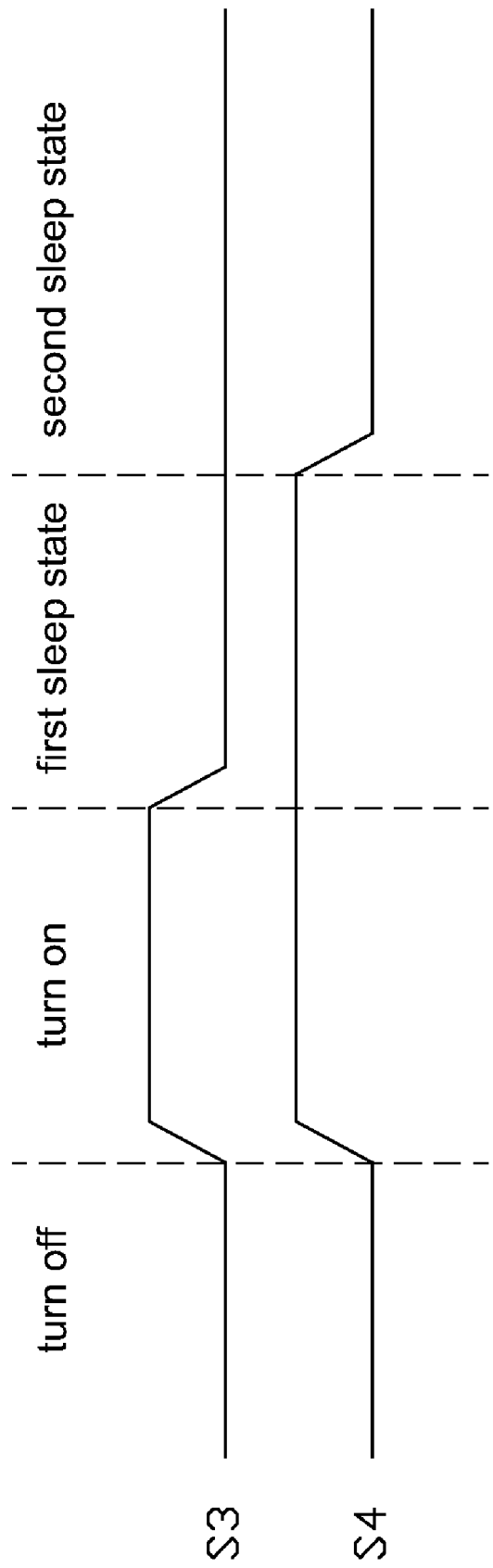
FIG. 2 is a sequence diagram of the sleep signals from a super I/O chip in FIG. 1.

Referring to FIG. 2, when the computer is off, the first sleep signal S3 and the second sleep signal S4 generated from the super I/O chip 10 are both at low level. When the computer is turned on, the first sleep signal S3 and the second sleep signal S4 both go to high level. When the computer enters the first sleep state, the first sleep signal S3 goes to low level, the second sleep signal S4 remains at high level. When the computer enters the second sleep state, the first sleep signal S3 remains at low level, and the second sleep signal S4 goes to low level.

Figure 3:
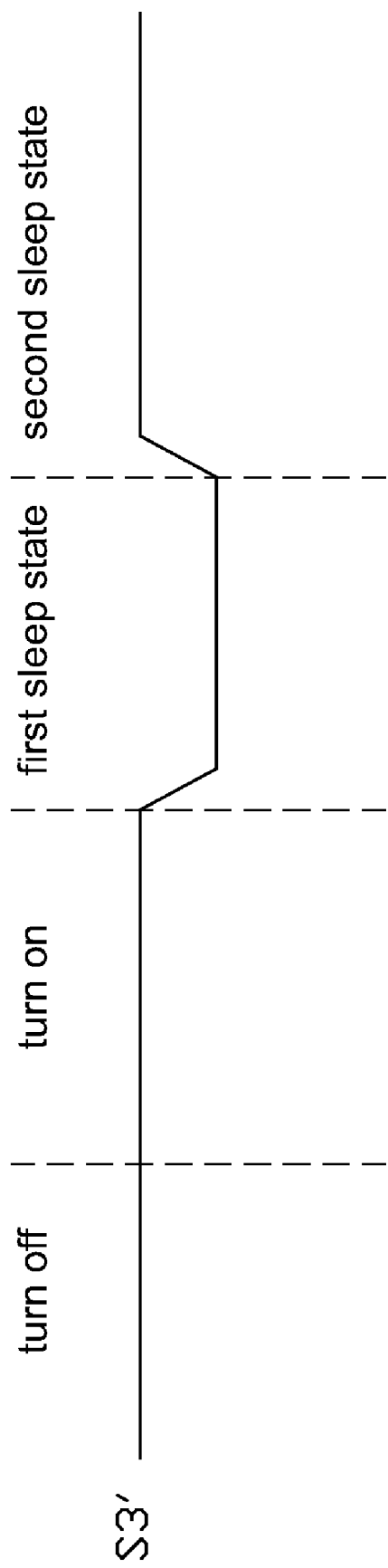
FIG. 3 is a sequence diagram of a sleep control signal from a chipset.

Referring to FIG. 3, when the computer is off, the sleep control signal S3' generated from the chipset is at high level. When the computer is turned on, the sleep control signal S3' remains at high level. When the computer enters the first sleep state, the sleep control signal S3' goes to low level. When the computer enters the second sleep state, the sleep control signal S3' goes to high level.

When the computer is off, the assistant voltage terminal 100 and the main voltage terminal 300 both input a low level signal to the comparator 20, and the comparator 20 outputs a low level signal to the node 11. The startup signal terminal 500 inputs a high level signal to the gate of the transistor Q1, thus Q1 is on. The drain of the transistor Q1 outputs a low level signal to the node 11. The node 11 inputs a low level signal to the gate of the transistor Q2, thus Q2 is off. The drain of the transistor Q2 outputs a high level signal to the gate of the transistor Q3, thus Q3 is on, and the drain of Q3 outputs a low level signal to the node 31. The S3' signal terminal inputs a high level signal to the drain of the transistor Q4. The node 11 inputs a low level signal to the gate of the transistor Q4, thus Q4 is off. The drain of the transistor Q4 outputs a high level signal to the base of the transistor Q5, thus Q5 is on. The collector of the transistor Q5 outputs a low level signal to the node 51. Thereby the voltages of the node 31 and the node 51 are both at low level consistent with that of the S3 and S4 signals generated by the super I/O chip 10 when the computer is off.

When the computer is on and awake, the assistant voltage terminal 100 and the main voltage terminal 300 both input a high level signal to the comparator 20. When a voltage of the node 23 is higher than that of the node 21, the comparator 20 will output a high level signal to the node 11. The startup signal terminal 500 inputs a low level signal to the gate of the transistor Q1, the transistor Q1 is off. The drain of the transistor Q1 outputs a high level signal to the node 11. The node 11 will input a high level signal to the gate of the transistor Q2, the transistor Q2 is on. The drain of the transistor Q2 outputs a low level signal to the gate of the transistor Q3, the transistor Q3 is off. The drain of the transistor Q3 will output a high level signal to the node 31. The S3' signal terminal inputs a high level signal to the drain of the transistor Q4, and the node 11 inputs a high level signal to the gate of the transistor Q4, the transistor Q4 turns on and outputs a low level signal to the base of the transistor Q5, the transistor Q5 is off. The collector of the transistor Q5 outputs a high level signal to the node 51. Thereby the voltages of the node 31 and the node 51 are both high consistent with that of the S3 and S4 signals generated by the super I/O chip 10 when the computer is on and awake.

When the computer enters the first sleep state, the startup signal terminal 500 inputs a high level signal and the transistor Q1 is on and outputs a low level signal to the node 11. The main voltage terminal 300 inputs a low level signal to the comparator 20. The comparator 20 outputs a low level signal to the node 1. The node 11 will input a low level signal to the gate of the transistor Q2, the transistor Q2 is turned off. The drain of the transistor Q2 outputs a high level signal to the gate of the transistor Q3, the transistor Q3 is turned on. The drain of the transistor Q3 will output a low level signal to the node 31. The S3' signal terminal inputs a low level signal to the drain of the transistor Q4 and the base of the transistor Q5. The transistor Q4 is off, and the drain of Q4 is pulled low level by S3' signal terminal. The transistor Q5 remains off, and the collector of the transistor Q5 continues to output a high level signal to the node 51. Thereby the voltage of the node 31 is low and the voltage of the node 51 is high, consistent with that of the S3 and S4 signals generated by the super I/O chip 10 when the computer is in the first sleep state.

When the computer enters the second sleep state, the startup signal terminal 500 inputs a high level signal and the transistor Q1 is on and outputs a low level signal to the node 11. The main voltage terminal 300 inputs a low level signal to the comparator 20. The comparator 20 outputs a low level signal to the node 11. The node 11 will input a low level signal to the gate of the transistor Q2, and the drain of Q2 outputs a high level signal to the gate of the transistor Q3, and the drain of Q3 outputs a low level signal to the node 31. The S3' signal terminal inputs a high level signal to the drain of the transistor Q4. The node 11 inputs a low level signal to the gate of the transistor Q4, the transistor Q4 is turned off. The drain of the transistor Q4 outputs a high level signal to the base of the transistor Q5, the transistor Q5 is turned on. The collector of the transistor Q5 outputs a low level signal to the node 51. Thereby the voltages of the node 31 and the node 51 are both at low level consistent with that of the S3 and S4 signals generated by the super I/O chip 10 when the computer is in the second sleep state.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sequence circuit for making a sleep control signal output from a sleep control signal terminal of a chipset consistent with a first sleep signal and a second sleep signal output from a first sleep signal terminal and a second sleep signal terminal of a super I/O chip of a computer for controlling the sleep states of the computer, comprising:
   a switch circuit having an input terminal connected with a node and an output terminal connected to the first sleep signal terminal of the super I/O chip; and
   a control circuit comprising a first transistor and a second transistor, the first transistor having a gate connected to the node and a drain connected to the sleep control signal terminal of the chipset, the second transistor having a base connected to the drain of the first transistor and a collector connected to the second sleep signal terminal of the super I/O chip;
   wherein when the computer is off or in one of the sleep states, the node is at low level and the output terminal of the switch circuit outputs a low level signal; when the computer is on, the node is at high level and the output terminal of the switch circuit outputs a high level signal.

2. The sequence circuit as described in claim 1, wherein the switch circuit comprises a third transistor and a fourth transistor, a gate of the third transistor acting as the input terminal of the switch circuit and being connected to the node, a gate of the fourth transistor being connected to a drain of the third transistor, a drain of the fourth transistor acting as the output terminal of the switch circuit and being connected to the first sleep signal terminal of the super I/O chip, the sources of the third and fourth transistors being connected to ground.

3. The sequence circuit as described in claim 1, wherein the node is connected to a drain of a field effect transistor, the field effect transistor has a gate connected to a signal terminal and a source connected to ground, the signal terminal is at high level when the computer is off or in one of the sleep states and at low level when the computer is on.

4. The sequence circuit as described in claim 1, wherein the node is connected to an output terminal of a comparator, the comparator has an inverting terminal connected to an assistant voltage terminal and a non-inverting terminal connected to a main voltage terminal.

5. The sequence circuit as described in claim 4, wherein when the computer is off, the assistant voltage terminal and the main voltage terminal are both at low level; when the computer is turned on, the assistant voltage terminal and the main voltage terminal both input a high level signal to the comparator and the level of the signal output from the main voltage terminal is higher than that of the signal output from the assistant voltage terminal; when the computer is in one of the sleep states, the main voltage terminal inputs a low level signal to the comparator.

6. A sequence circuit for a computer entering a first sleep state or a second sleep state, comprising:
a chip having a first sleep signal terminal and a second sleep signal terminal configured for outputting a first sleep signal and a second sleep signal to control the sleep states of the computer;
a switch circuit having an input terminal connected with a node and an output terminal connected to the first sleep signal terminal;
a control circuit having an input terminal connected with the node and an output terminal connected to the second sleep signal terminal; and
a sleep control signal terminal provided by a chipset of the computer being connected to the control circuit configured for outputting a sleep control signal;
wherein when the computer is off, the sleep control signal terminal is at high level, the node is at low level, the switch circuit and the control circuit both output a low level signal; when the computer is on, the sleep control signal terminal is at high level, the node is at high level, the switch circuit and the control circuit both output a high level signal; when the computer enters the first sleep state, the sleep control signal terminal is at low level, the node is at low level, the switch circuit outputs a low level signal, and the control circuit outputs a high level signal; when the computer enters the second sleep state, the sleep control signal terminal is at high level, the node is at low level, the switch circuit and the control circuit both output a low level signal; thereby making a sequence of the sleep control signal of the chipset consistent with that of the first sleep signal and the second sleep signal of the chip.

7. The sequence circuit as described in claim 6, wherein the control circuit comprises a first field effect transistor (FET) and a first transistor, a gate of the FET acting as the input terminal of the control circuit and being connected to the node, a drain of the FET being connected to the sleep control signal terminal, a base of the first transistor being connected to the drain of the FET, a collector of the first transistor acting as the output terminal of the control circuit and being connected to the second sleep signal terminal of the chip, an emitter of the first transistor being connected to ground.

8. The sequence circuit as described in claim 6, wherein the switch circuit comprises a third transistor and a fourth transistor, a gate of the third transistor acting as the input terminal of the switch circuit and being connected to the node, a gate of the fourth transistor being connected to a drain of the third transistor, a drain of the fourth transistor acting as the output terminal of the switch circuit and being connected to the first sleep signal terminal of the chip, sources of the third and fourth transistors being connected to ground.

9. The sequence circuit as described in claim 6, wherein the node is connected to a drain of a field effect transistor, the field effect transistor has a gate connected to a signal terminal and a source connected to ground, the signal terminal is at high level when the computer is off or in one of the sleep states and at low level when the computer is turned on.

10. The sequence circuit as described in claim 6, wherein the node is connected to an output terminal of a comparator, the comparator also has an inverting terminal connected to an assistant voltage terminal and a non-inverting terminal connected to a main voltage terminal.

11. The sequence circuit as described in claim 10, wherein when the computer is off, the assistant voltage terminal and the main voltage terminal are both at low level and the output terminal is at low level; when the computer is on, the assistant voltage terminal and the main voltage terminal both input a high level signal to the comparator and the output terminal is at high level; when the computer is in one of the sleep states, the main voltage terminal inputs a low level signal to the comparator and the output terminal is at low level.

12. The sequence circuit as described in claim 6, wherein the chip is a super I/O chip.

13. A sequence circuit for making a sleep control signal output from a sleep control signal terminal of a chipset consistent with a first sleep signal and a second sleep signal respectively output from a first sleep signal terminal and a second sleep signal terminal of a super I/O chip of a computer for controlling the sleep states of the computer, comprising:
a switch circuit having an input terminal connected with a node and an output terminal connected to the first sleep signal terminal of the super I/O chip, the node connected to a startup signal terminal via a first transistor, the sequence of a signal output from the output terminal being consistent with that of a signal output from the node, the sequence of a startup signal output from the startup signal terminal being reverse to that of the first sleep signal;
a control circuit comprising two input terminals one connected to the node and the other connected to the sleep control signal terminal of the chipset, and an output terminal connected to the second sleep signal terminal of the super I/O chip, a signal output from the output terminal of the control circuit being at high level when the signal output from the node and the sleep control signal both are high level or low level, the signal output from the output terminal of the control circuit being at low level when one of the signal output from the node and the sleep control signal is at high level and the other is at low level; and
a comparator comprising an inverting input terminal connected to an assistant voltage terminal which is configured for providing a first voltage to electronic components in the computer and a non-inverting input terminal connected to a main voltage terminal which is configured for providing a second voltage to the electronic components in the computer, and an output terminal connected to the node.

14. The sequence circuit as described in claim 13, wherein the switch circuit comprises a second transistor and a third transistor, a gate of the second transistor acting as the input terminal of the switch circuit and being connected to the node, a gate of the third transistor being connected to a drain of the second transistor, a drain of the third transistor acting as the output terminal of the switch circuit and being connected to the first sleep signal terminal of the chip, the sources of the second and third transistors being connected to ground.

15. The sequence circuit as described in claim 14, wherein the control circuit comprises a fourth transistor and a fifth transistor, a gate of the fourth transistor acting as the input terminal of the control circuit and being connected to the node, a drain of the fourth transistor being connected to the sleep control signal terminal, a base of the fifth transistor being connected to the drain of the fourth transistor, a collector of the fifth transistor acting as the output terminal of the control circuit and being connected to the second sleep signal terminal of the chip, a source of the fourth transistor and an emitter of the fifth transistor being connected to ground.

* * * * *